United States Patent [19]

Poque et al.

[11] Patent Number: 4,641,670
[45] Date of Patent: Feb. 10, 1987

[54] VEHICLE WHEEL FOR A PNEUMATIC TIRE

[75] Inventors: Dionysius J. Poque; Norbert Zinnen, both of Aachen, Fed. Rep. of Germany

[73] Assignee: Uniroyal Englebert Reifen GmbH, Aachen, Fed. Rep. of Germany

[21] Appl. No.: 671,571

[22] Filed: Nov. 15, 1984

[30] Foreign Application Priority Data

Nov. 21, 1983 [DE] Fed. Rep. of Germany ....... 3341969

[51] Int. Cl.$^4$ ...................... B60C 17/04; B60C 17/10; B60B 21/10
[52] U.S. Cl. ................. 152/158; 152/379.4; 152/520; 152/521
[58] Field of Search ............ 152/158, 330 RF, 330 L, 152/151, 192, 155, 157, 331, 339, 378 R, 379.3, 379.4, 379.5, 386, 393, 396, 405, DIG. 17, 331.1, 516, 339.1, 520, 400, 401, DIG. 9; 301/38 R, 39 R, 39 T, 95, 96, 97, 98, 63 R, 63 PW, 65

[56] References Cited

U.S. PATENT DOCUMENTS 2,844,180  7/1958  Omeron ............................. 152/158
4,281,700  8/1981  Ross .................................. 152/158

FOREIGN PATENT DOCUMENTS 2437773  2/1976  Fed. Rep. of Germany ...... 152/158

Primary Examiner—Donald E. Czaja
Assistant Examiner—Thomas Bokan
Attorney, Agent, or Firm—Becker & Becker, Inc.

[57] ABSTRACT

A vehicle wheel having a one-piece wheel rim on which can be mounted a pneumatic tire. The tire has a tread strip, two sidewalls, a carcass, and two tire beads which are laterally spaced from one another and contain substantially inextensible bead cores. The wheel rim has two rim shoulders, which are laterally spaced from one another and extend outwardly into a respective rim edge or into a respective rim flange. The rim also has a radially recessed rim base. The wheel further includes an emergency operation support member which is disposed in the recessed rim base and has a supporting surface which is located radially outwardly of the rim flange. The emergency operation support member is provided with a radially inner surface which faces the rim shoulder and is disposed at a distance from the latter, this distance corresponding to at least the thickness of the tire bead. An annular chamber is provided which extends further radially inwardly to the recessed rim base, and is widened axially inwardly.

4 Claims, 12 Drawing Figures

4,641,670

VEHICLE WHEEL FOR A PNEUMATIC TIRE

BACKGROUND OF THE INVENTION

1. Field of the Invention

The present invention relates to a vehicle wheel for a pneumatic tire. The wheel comprises a one-piece wheel rim on which can be mounted the pneumatic tire, which has a tread strip, two sidewalls, and a carcass, in addition to two tire beads which are laterally spaced from one another and contain substantially inextensible bead bores; the wheel rim has two rim shoulders, which are laterally spaced from one another and extend outwardly into a respective rim edge or into a respective rim flange, and a radially recessed rim base; the wheel also comprises an emergency operation support member which is disposed in the recessed rim base and has a supporting surface which is located radially outwardly of the rim flange and has a width which corresponds approximately to that of the rim base.

2. Description of Prior Art

In such vehicle wheel and pneumatic tire assemblies, the tire beads are held in position by a rim flange to prevent them from slipping laterally from the wheel rim. In an emergency operation, the deflated tire is supported by an emergency operation support member. However, the known vehicle wheels having an emergency operation support member are disadvantageous for a number of reasons. The drop well, which is provided as a means for simplifying tire mounting, cannot fulfill this function when essential elements of the emergency operation support member fill this drop well. With the known arrangement and construction, the emergency operation support member is suitable for absorbing load during emergency operation, but it does not compensate for the dangerous operational condition which results from slight losses of compressed air. This applies, for example, when travelling around curves at excessively high speed. The emergency operation support member therefore does not have a means for ensuring safety and preventing release from the wheel rim when the tire beads of a tire which has little air therein initially slide into the drop well and can then slip off the vehicle wheel over the rim flange, thereby ruining the pneumatic tire.

Known, multiple-part wheel rims, which are capable of being assembled during tire mounting, have a closed drop well which serves to prevent the release of beads. However, from the point of view of construction and operation, the multiple-part rims are complicated.

The present invention is based on the recognition that a vehicle wheel and tire assembly of the type described should comprise a tire of conventional, standard construction, and a one-piece wheel rim, likewise of conventional, standard construction; the tire should also be easy to mount, and should reliably fulfill normal, everyday travel operations. In addition, the wheel should have an emergency operation support member which has a simple construction and reliably copes with the emergency operation situation. However, this vehicle wheel should also be capable of ensuring safe travel in the event of a loss in compressed air prior to emergency operation and during emergency travel with a deflated tire, without the need to provide additional means therefor.

In this respect, the invention is concerned with improving the emergency operation support member or, respectively, with an integrated component part comprising wheel rim and emergency operation support member.

The technical object of the present invention is to develop a vehicle wheel of the aforementioned general type in such a way that the emergency operation support member is provided with a means for preventing the tire bead from being released from the one-piece wheel rim, and with a means for accommodating the tire bead during emergency operation, without adversely affecting, rather fully maintaining, the simplified mounting of the tire by means of a rim drop well, and the advantageous support of the tire during emergency operation.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
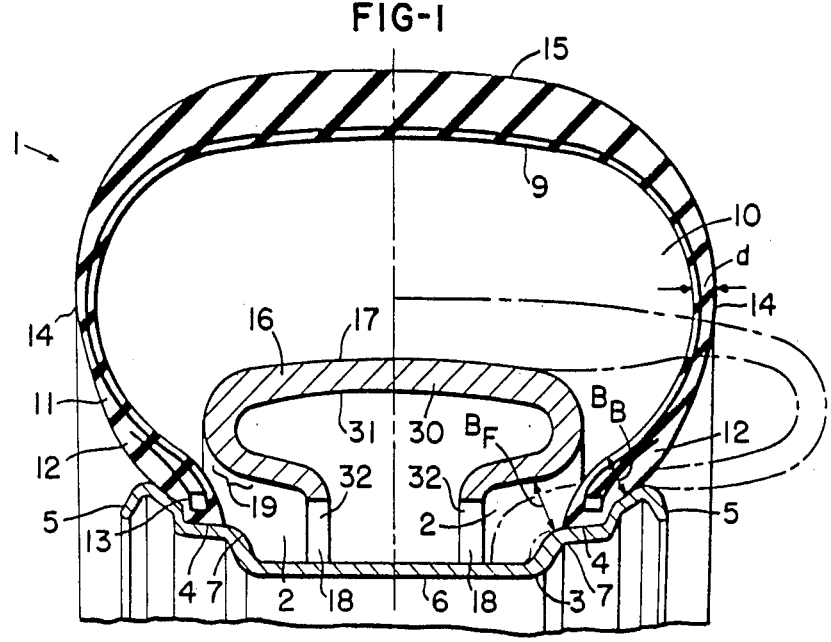
FIG. 1 is a cross-sectional view of pneumatic tire and a vehicle wheel having an emergency operation support member.

The vehicle wheel of the present invention is characterized primarily in that a radially inner surface, which faces the rim shoulder and forms an opening therewith, is provided on the emergency operation support member and is disposed at a distance from the rim shoulder, said distance corresponding to at least the thickness of the tire bead; moreover, an annular chamber is provided which extends further radially inwardly to the recessed rim base and is widened axially inwardly.

Thus, the inner surface on the emergency operation support member, and the rim shoulder, form an opening which extends to the radially inwardly provided annular chamber. The opening and annular chamber are of such dimensions that, for advantageous mounting, the tire bead can be moved into the recessed rim base, where it can be advantageously accommodated in an emergency operation situation. When a tire has little air therein, the surface on the emergency operation support member forms a kind of butting resistance which initially prevents the tire bead from moving further. When the tire has become deflated and the tire bead has moved into the annular chamber, the surface on the emergency operation support member prevents the tire bead from moving out of the drop well and being able to be released over the rim flange.

The surface which jointly forms the opening is preferably provided at a predetermined, but selectable position on the inner contour of the emergency operation support member, said position being a point of a curve which extends essentially parallel to an imaginary line between the inner edge of the rim shoulder and the rim flange, said curve extending, moreover, radially outwardly approximately parallel to the outer contour of the tire.

A radially inner surface and an annular chamber may be provided on each side of the emergency operation support member.

The inner surface may be a rectilinearly defined surface, especially a conically tapering surface, but it may also be an arcuately defined surface, especially one which is rounded in the region of the lateral edge of the emergency operation support member.

The shape and position of the surface depend on the size and shape of the emergency operation support member. The surface for car rims may differ from that of truck or motorcycle rims.

The clear distance between the surface on the emergency operation support member and the rim shoulder is preferably equivalent to 1.1 to 2 times the thickness of the tire bead of the particular tire used in the respective actual size thereof. The clear distance may be increased up to 3 times the bead thickness.

The annular chamber, when viewed in cross-section, may have the shape of a tire bead.

The novel form for the surface and the annular chamber on the emergency operation support member affects the radial recessed portion of the rim base. The rim base may have a height of only 0.3 times the height of a conventional drop well, yet it nevertheless fulfills the functions of a mounting recess, and reliably accommodates the bead during emergency operation. The depth of the rim bed may not be greater than the actual height of the rim flange.

The recessed rim base and the associated emergency operation support member may be symmetrical or asymmetrical.

The cross-section of the essentially annular emergency operation support member is preferably mushroom-shaped, T-shaped, or I-shaped. The supporting surface of the support member may be concavely curved. The emergency operation support member may be an integrated part of a one-piece wheel rim, or a separate component which is securely connectable to the wheel rim. Such a component may be subsequently attached wheel rims having a drop well.

The emergency operation support member may be formed from metallic materials or at least partially metallic materials. However, non-deformable, stress-resistant non-metallic materials may also be used, such as, for example, plastics materials or synthetic resins. For improved air volume utilization of the tire, a hollow emergency operation support member may be provided with apertures.

As is known per se, the emergency operation support member may be provided with a special support-surface coating, or the supporting portion may be formed from such a coating. The novel feature is that the emergency operation support member may be selectively provided with a material which produces high or low friction. This depends on whether the vehicle wheel is on the driven or non-driven axle.

If, during emergency operation without air pressure, the tire beads should slip into the drop well, so that slight relative movements between the tire and the emergency operation surface are desirable, for example in the case of a drive wheel, the contact surface is formed via a material of high friction.

If the tire beads are to be kept as long as possible on rim shoulders by means of a so-called safety edge (hump), i.e. in the operational condition of a tire which has little air therein, so that transverse and circumferential forces can be transmitted through the tire beads, the contact surface of the emergency operation support member may be coated with a material of low friction, or such a substance, such as, for example, a suitable lubricant, may be applied to said contact surface or to the inner surface of the tire. If lubrication is desirable, a lubricant container may advantageously be provided, preferably in the hollow emergency operation support member.

The emergency operation support member is preferably as wide on the radially outer supporting surface as is the recessed rim base, with the width ranging between 0.75 to 1.5 times the width of the rim base. In some cases, it may also be axially extended via an additional element. The radial height of the emergency operation support member exceeds the rim flange by an amount corresponding at least to the thickness of the sidewall of the tire. It may be radially up to 0.7 times the tire height minus the rim flange height. However, the emergency operation support member is preferably not that high.

DESCRIPTION OF PREFERRED EMBODIMENTS

Referring now to the drawings in detail, the vehicle wheel and pneumatic tire assembly 1 shown in FIG. 1 essentially comprises a one-part wheel rim 3 and a pneumatic tire 10, and is additionally provided with an emergency running or operation support member 16. The assembly 1 comprises a conventional, standardized wheel rim and a conventional pneumatic tire. It is assembled by introducing the wheel rim into the pneumatic tire.

The wheel rim essentially comprises the two rim shoulders 4, the respective rim flanges 5, and a central, radially recessed rim base 6. This rim base may have conventional, standardized dimensions, or it may also have a base depth which is radially less than the standardized rim base. It may also be wider than the standardized rim base. Because of its construction, the wheel rim 3 is capable of accommodating the emergency operation support member 16 therein. Both elements may be joined to form a one-piece unit, or a structural unit which is only separate for the basic assembly.

The pneumatic tire 10 comprises a carcass 11, especially a radial carcass in the case of a belted radial tire construction, two tire beads 12, each of which is provided with a substantially inextensible or pull-resistant bead core ring 13, two sidewalls 14, and a tread strip 15, especially a tread strip reinforced by a belt construction in the case of a belted tire.

The emergency operation support member 16 essentially comprises a carrier portion, the so-called supporting surface 17, which, during emergency operation, supports the inner surface 9 of the deflated or airless pneumatic tire 10, and the base 18 or upright portion, which, in the region of the recessed rim base 6, serves to connect the emergency operation support member to the wheel rim, or to form a structural unit therewith.

The emergency operation support member 16 also has a radially inwardly disposed surface 19 which faces the rim shoulder 4. It forms with the rim shoulder 4, and possibly also with a portion of the rim flange, a specific narrow location having the inside width $B_F$.

This width is slightly larger than the widest part $B_B$ of the tire bead. The width is preferably equivalent to 1.1 to 2 times the width $B_B$ of the tire bead 12.

As part of the narrow location created, the surface 19, on the one hand, is a kind of guide surface to permit simplified tire mounting with the aid of the drop well. In accordance with its function, on the other hand, there is provided a kind of butting surface in a critical travel situation when the pneumatic tire has little air remaining therein. The surface 19 prevents a tire bead from being released from its seat on the rim shoulder. Such operational conditions arise when travelling around curves at high speed. A pneumatic tire with little air therein is particularly dangerous because this situation remains almost unnoticed by the driver. Because of the novel butting surface 19, the tire bead is prevented from escaping from the wheel rim in such a critical situation. The additional function of the surface 19 is that of a barrier preventing the tire bead from being released during emergency operation at the position located opposite the contact surface. In the event of a tire puncture, when the pneumatic tire has lost its air, the tire beads move into the newly created annular chamber 2 which is formed between the base support 18 of the emergency operation support member, and the rim base 6 of the wheel rim. The shape and size of this annular chamber 2, one of which is provided at either end of the rim base, permit each chamber 2 to accommodate an entire tire bead 12 during emergency operation. During the emergency operation movement, the surface 19 then forms a kind of resistance which prevents the tire bead of the tire portion from escaping from the wheel rim without making contact with the ground.

The emergency operation support member preferably has a mushroom-shaped or T-shaped cross-section. The width of its supporting surface 17 essentially corresponds to the width of the rim base. Structurally speaking, the width of the supporting surface may be as wide as possible. This ensures an advantageous, wide supporting surface in the event of emergency operation. The freely accessible annular chamber of the drop well fully ensures that the tire can be easily mounted.

Because of the inventive surface 19 on the emergency operation support member 16, and the free annular chamber 2, the rim base is functionally divided in such a way that it is still available for simplified tire mounting; in an emergency operation situation, it can accommodate the tire beads for the purpose of advantageous relative movement between tire and rim during emergency operation; and it permits the supporting surface to be as wide as possible. This arrangement also ensures that, even when travelling around very sharp curves, the tire bead cannot escape from the wheel rim at low air pressure.

The vehicle wheel and tire assembly 1 has a wheel rim 3 which may be used in the normalized or standardized arrangements for cars with a B-, C-, J-, TR-, TD- or DL-flange and a gently sloping rim shoulder, or with a more steeply sloping steep shoulder for trucks or two-wheeled vehicles. The drop well may be symmetrically or asymmetrically arranged. The rim may be provided with or without a safety edge (hump). The rim shoulder may also have an inclination which deviates from the norm.

Figure 2:
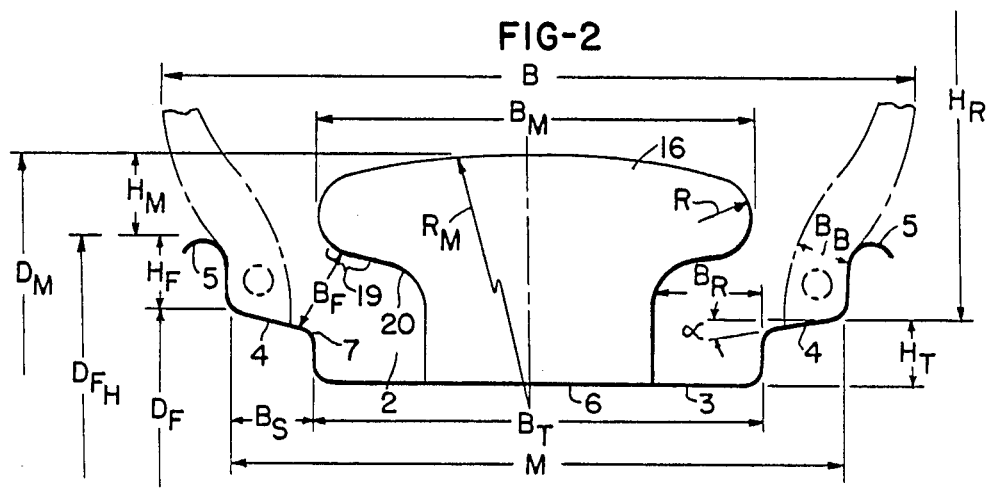
FIG. 2 is a cross-sectional, diagrammatic sketch of a vehicle wheel having a wheel rim and an emergency operation support member, and of tire beads.

Additional details can be found in the diagrammatic sketch of FIG. 2. The tire height $H_R$, measured from the rim shoulder 4 to the maximum radial extension of the tread strip 15, and the tire width B, measured at that location of the sidewalls 14 having the widest axial dimension, are important structural measurements, as is the open width M of the wheel rim 3, measured at the location of widest axial extension of the two rim shoulders 4. The ratio of tire height $H_R$ to width B is $\leq 60$.

The height of the rim flange 5 is denoted by $H_F$, and the diameter thereof is denoted by $D_{FH}$; the axial extension of the rim shoulder 4 is denoted by $B_S$, the diameter by $D_F$, and the inclination of the rim shoulder 4 relative to the axis-parallel line is denoted by the angle $\alpha$. This angle may be 5° to 15°, and it may also be 4° to 16°. The height of the radially recessed rim base 6 is denoted by $H_T$, and its width is denoted by $B_T$.

The width of the emergency operation support member 16 is denoted by $B_M$, and its diameter is denoted by $D_M$; the radius of the curved supporting surface is denoted by $R_M$; and the radius of the lateral curvature is denoted by R. The radial height of the emergency operation support member, measured over the rim flange, is denoted by $H_M$. The following structural relationships and sizes are important for the arrangement and form of the emergency operation support member and for the association with regard to the wheel rim.

The tire bead width $B_B$ corresponds to, or is slightly smaller than, the rim shoulder width $B_S$ of a wheel rim without a safety edge (hump).

The emergency operation support member width $B_M$ is about 0.75 to 1.5 times the width of the rim base 6.

The radial projection $H_M$ of the emergency operation support member beyond the rim flange at least equals, or is twice, the thickness d of a sidewall of the tire, and may be equivalent to up to 0.7 times the tire height $H_R$.

The radius of curvature $R_M$ for the supporting surface is about 1.0 to 15 times the open width M.

The height $H_T$ of the rim base is 0.3 to 1.0 times the height $H_F$ of the recessed rim flange 5.

Figure 6:
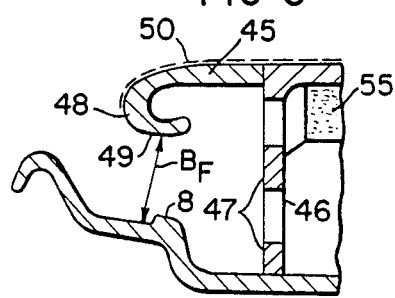
FIG. 6 is a partial, cross-sectional view through a safety wheel rim having a laterally open emergency operation support member.

The distance $B_F$ between the radially inwardly disposed surface 19 on the emergency operation support member and the rim shoulder 4, especially on its inner edge 7 without a safety edge (hump), which is denoted by 8 in FIG. 6, is equivalent to 1.1 to 2.0 times the tire bead thickness $B_B$, and may be equivalent to up to 3.0 times the bead width $B_B$. This depends on the size of the tire and the rim.

The drop well is no deeper than the height of the rim flange. This measure serves to prevent the tire from being released by the rim flange during emergency operation when there is full contact with the ground on the opposite side of the tire.

Figure 3:
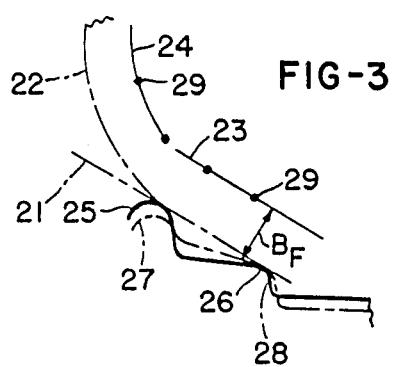
FIG. 3 is a diagrammatic sketch of a wheel rim portion and curve points for the position of an inner surface of an emergency operation support member.

The position of the radially inner surface 19 depends on the size of the tire and rim, and may be fixed at a predetermined, yet selectable position on the internal contour 20. As explained with reference to FIG. 3, an imaginary reference line 21 forms the basis therefor.

It is the tangent to rim flange 25 and shoulder edge 26 of a rim having a gently sloping shoulder or, respectively, to rim flange 27 and shoulder edge 28 of a rim having a steeply sloping shoulder. This imaginary reference line continues radially outwardly above the rim flange in an imaginary reference line 22 which substantially corresponds to the external configuration of the tire bead and sidewall.

The reference lines 23 and 24 extend parallel to these reference lines 21 and 22. Curve points 29 are located on the lines 23 and 24, and are disposed at the distance $B_F$ from the rim shoulder, rim flange, or lines 21 and 22. One of these lines may be the position for the inner surface 19. When the tire dimension is greater, the distance between lines 22 and 24 may be slightly less than $B_F$. Ultimately, a free passage must be ensured for the tire bead through the narrow position between the surface 19 and the rim shoulder 4.

When viewed from the surface 19, the annular chamber 2 extends radially and axially inwardly, and its size and form are at least slightly larger than a tire bead.

The width $B_R$ of the annular chamber is about 1.5 times wider than the tire bead 12 in the width $B_B$.

The annular chamber 2 extends in the radial depth to the rim base 6. The annular chamber is axially delimited by the inner contour of the leg or base 18 of the emergency operation support member and the side wall or edge 7 at the transition between rim shoulder 4 and drop well 6.

FIG. 1 also shows schematically deflated tire in the emergency operating position (dashed lines), with the tire bead being located in the annular chamber 2, the sidewall being bulged laterally, and the remaining portion of the tire resting on the supporting surface 17.

Thus, the surface 19 prevents the tire bead 12 from moving out of the drop well at the opposite side (not shown). The configuration of the surface 19 may be rectilinear or arcuate. In the embodiment shown in FIG. 1, the surface 19 comprises conically tapering surfaces which are set at an angle to one another and are rounded by a radius at the point of intersection.

The emergency operation support member of FIG. 1 moreover essentially comprises an annular hollow body 30 having walls 31 which are formed from metallic or non-metallic material and are suitable for loadbearing purposes during emergency operation. Air may also flow into the interior of the hollow body through apertures 32 in the walls 31. The hollow body 30 is securely connected to the rim base 6 by means of recesses and transverse members (not shown). It may also be a cast, welded, screw-connected, flanged, riveted, or similar arrangement.

Figure 4:
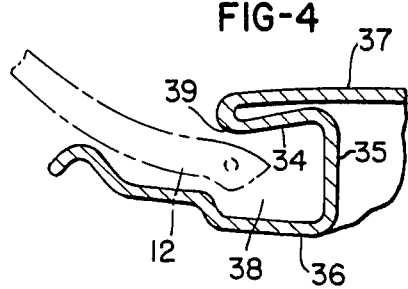
FIG. 4 is a partial, cross-sectional view through a wheel rim having an emergency operation support member of one-piece construction.

FIG. 4 illustrates a embodiment of a one-part construction. The rim base 36 passes into a radial web wall 35 which is not only integrally connected at the radially outer location with a laterally protruding cylindrical or cover wall 34, which is bent back on itself, but is also closed-off as a hollow body. The supporting surface 37 and the guide surface 39 are formed on the wall 34. Because of the web and roof arrangement, a free annular chamber 38 is left above the drop well.

Figure 5:
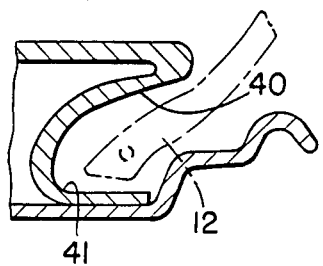
FIG. 5 is a partial, cross-sectional view through a wheel rim having a modified emergency operation support member of compound construction.

A similar, alternative embodiment is shown in FIG. 5, wherein the annular web 40 extends into a transverse annular member 41 in curved form in the radially lower region. The member 41 serves as a securing base with the drop well rim which is provided. A deep rim base is reduced in height by the web height. Such a support can easily be subsequently incorporated into existing wheel rims. In the two embodiments shown in FIGS. 4 and 5, the surface 39 or 40, respectively, is arcuate, being concave in one case and convex in the other case. The tire beads 12 (shown by dashed lines) of the tire (not shown) indicate various installation positions.

The alternative embodiment shown in FIG. 6 illustrates an emergency operation support member 45 having an open construction. It comprises a hollow annular body 46 having webs 47 through which openings extend, with laterally protruding supporting surfaces 48 being secured to the webs. The supporting surfaces are curved inwardly. The resultant bead serves as a reinforcing means. The surface 49 is also provided on the bead, and forms the narrow location $B_F$ with the rim shoulder. The lateral distance between the webs 47 and the side wall of the drop well is selected in such a manner that there remains an adequately large annular chamber for accommodating the tire bead, while the non-deformable structure of the emergency operation support member 45 is taken into consideration.

The wheel rim is provided with a safety edge 8 (hump), which is known as the means for preventing the axial movement of the tire bead. It initially prevents the tire bead from moving into the drop well. In this case, the surface 49 serves as a butting surface for the tire when the air pressure is low. Because the tire has such secure tire beads, transverse and circumferential forces can be transmitted when emergency operation is imminent or occurs. To improve the low friction which is then desired between the inner surface 9 of the tire and the surface of the supporting surface 48, a lubricant 50 may be provided for this contact surface. An antifriction coating may also be provided. This measure may be considered for a vehicle wheel which is not driven, i.e. one which is entrained. The friction-reducing means may also be provided on the inner surface 9 of the tire.

A lubricant container which may possibly be provided is denoted by 55.

Figure 7:
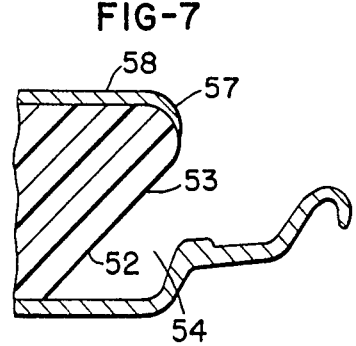
FIG. 7 is a partial, cross-sectional view through a safety wheel rim having an emergency operation support member of block ring construction.

The vehicle wheel shown in FIG. 7 presents an alternative embodiment. The main body is formed from a lightweight material, for example plastic material, or plastic material reinforced by metallic cord or glass fiber, or some other material. In this case, the narrow location surface 53 is provided on the contour 52. In the extension thereof, a surface is also provided as part of the annular chamber 54.

In the contact surface 57, this emergency operation support member has a material or a material coating 58 or the like which is suitable for producing high frictional values. This is intended for the operational case when slight relative movements are desired between the contact surface 57 and the inner surface 9 of the tire. In the event of an emergency operation, when the tire beads move into the rim drop well, low frictional values exist at the place of contact between the tire and the emergency operation support member. To permit, in this case, sufficiently large transverse and circumferential forces to also be transmitted, and to permit the load resting thereon to be carried, a material having a high frictional value may be provided. This may be considered, for example, for a drive wheel, even under emergency operation conditions, a minimum travelling distance has to be covered at an adequate minimum travelling speed wtihout any adverse effect.

Figure 8:
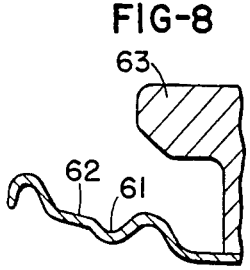
FIG. 8 is a partial, cross-sectional view through an alternative safety wheel rim having a modified emergency operation support member of T-shaped cross-section.

The embodiment shown in FIG. 8 has a standardized DL wheel rim 60, wherein a safety groove 61 is additionally provided in the rim shoulder 62. The pneumatic tire (not shown) is provided, at its tire bead, with an annular bead toe which corresponds to the groove 61. The emergency operation support member 63 has a T-shaped cross-section. The contours are essentially rectilinear; and the surface transitions are rounded.

Figure 9:
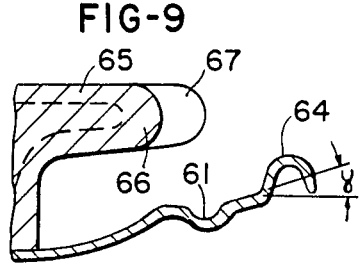
FIG. 9 is a partial, cross-sectional view through an alternative safety wheel rim having a further modified emergency operation support member which is provided with additional lateral elements.

The embodiment shown in FIG. 9 has a standardized TD wheel rim with a conically tapering wheel flange 64, which is inclined at an angle $\gamma$, and an additional safety groove 61. In this case, the emergency operation support member 65 also has a T-shaped cross-section. The standard embodiment, with edge 66 may, if necessary, be axially extended by an additional element 67. Such emergency operation members may be solid or hollow bodies formed from metal, from a non-metallic material, or from combinations of both materials.

Figure 10A:
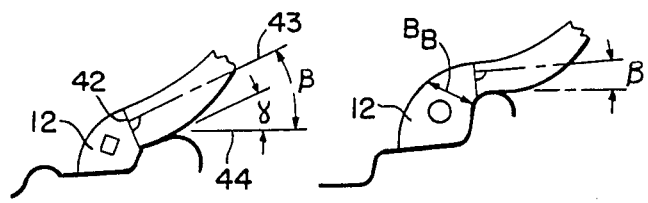
FIGS. 10a–c are schematic, fragmentary views of various tire beads having different bead inclinations and different wheel rims.
Figure 10B:
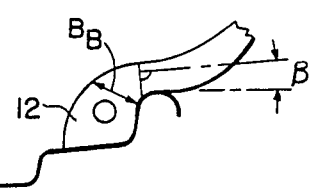
Figure 10C:
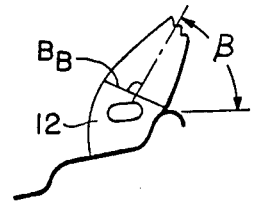

Three differently inclined tire beads 12 are shown in FIGS. 10a to 10c. The tire bead in FIG. 10a lies on a conically tapering rim flange, similar to flange 64 in FIG. 9. The central perpendicular line 43 is erected at the thick tire bead location 42. The angle $\beta$ of the bead inclination is formed by the line 43 and the axis-parallel line 44. $\beta$ amounts to 30°. The $T_R$ flange inclination is denoted by $\gamma$.

The tire bead in FIG. 10b has a central perpendicular line which forms a very small angle $\beta$ with the axis-parallel line; it may be 3° to 0°. The rim shoulder is slightly inclined, and the rim flange has the standard measurement. The tire bead in FIG. 10c has a central perpendicular line which amounts to about 60° in angle $\beta$. This bead is disposed on a steep shoulder rim.

Depending on the type and size of tire, the angles $\beta$ may be between 0° and 60°, and may be combined with various rims.

Because of the disposition and form of the emergency operation support member, the drop well may be kept as an aid for mounting, and yet a wide supporting surface may be provided on the emergency operation support member. When travelling around sharp curves, as well as during emergency operation situations, the tire bead is prevented from escaping from the wheel rim because a butting surface or barrier of a narrow location is provided between the emergency operation support member and the rim shoulder.

The present invention is, of course, in no way restricted to the specific disclosure of the specification and drawings, but also encompasses any modifications within the scope of the appended claims.

What we claim is:

1. In a vehicle wheel having a one-piece rim on which can be mounted a pneumatic tire which has a tread strip, two sidewalls, a carcass, and two tire beads which are laterally spaced from one another and contain substantially inextensible bead cores; said wheel rim having a radially recessed rim base, and including a rim drop well as well as respective axially outwardly extending rim shoulders, each of which ends in a respective rim flange; an emergency operation support member being disposed in said rim base and having a supporting surface which faces radially outwardly, being located radially outwardly of said rim flanges, and having a width which corresponds approximately to the width of said rim base;

the improvement in combination therewith which comprises: means for preventing the tire bead from being released from the one piece rim along with means for accommodating the tire bead during emergency operation, without adversely affecting, rather fully maintaining, the mounting of the tire by means of a rim drop well and the advantageous support of the tire during emergency running operation including a respective radially inner annular lateral guide surface to permit tire mounting with said rim drop well provided with said emergency operation support member including a very wide annular emergency-running support surface and across from at least one of said rim shoulders, said respective radially inner annular laterally guide surface facing said rim shoulder being spaced therefrom by a narrow constricted distance which corresponds at least to the thickness of one of said tire beads and serves as said means for preventing the tire bead from being released from the one-piece rim; respective annular chambers being provided axially inwardly of said radially inner annular laterally guide surfaces, and extending to said rim base, said chambers serving as said means for accommodating the tire bead during emergency running operation, without adversely affecting, rather fully maintaining the mounting of the tire via rim drop well and the advantageous very wide annular emergency-running support surface for the tire during emergency running operation; said radially inner surface being provided at a selectively predetermined position on the radially inner contour of said emergency operation support member, said position being a point on a curve which initially extends essentially parallel to an imaginary line extending between the axially inner edge of one of said rim shoulders and the associated rim flange, and which radially outwardly thereof extends approximately parallel to an imaginary line which conforms to the outer contour to a mounted tire; a respective radially inner support member surface and annular chamber in the vicinity of each of said rim shoulders; said distance between said radially inner surface and said rim shoulder being in a range of from 1.1 to 3 times said thickness of said tire bead; the depth of said annular chamber being in a range of 0.3 to 1.0 times the height of the drop well of a standard rim, measured from a line which is parallel to the central axis of said wheel and defines said rim shoulder; said recessed rim base and said emergency operation support member being symmetrically arranged as well as the width of said supporting surface of said emergency operation support member being in a range of 0.75 to 1.5 times width of said rim base.

2. A vehicle wheel according to claim 1, in which the radial height of said emergency operation support member is up to 0.7 times the height of said tire less the height of said rim flange, and is greater than half of the diameter of said rim flange by at least the thickness of said tire sidewall.

3. A vehicle wheel according to claim 1, in which the angle of inclination of said rim shoulder to a line parallel to the central axis of said wheel is in the range of from 4° to 16°.

4. A vehicle wheel according to claim 1, in which the angle of inclination of a tire bead of a tire mounted on said rim shoulders is in the range of from 0° to 60°, said angle being formed between a line which is parallel to the central axis of said wheel and intersects the central perpendicular line in said tire bead, which last-mentioned line is perpendicular to a line extending across a thick location of said tire bead.

* * * * *